United States Patent
Werth et al.

(10) Patent No.: US 7,866,486 B2
(45) Date of Patent: Jan. 11, 2011

(54) COMPOSITE CERAMIC HOLLOW FIBRES METHOD FOR PRODUCTION AND USE THEREOF

(75) Inventors: Steffen Werth, Solingen (DE); Nicole Dinges, Reutlingen (DE); Mirjam Kilgus, Glatten (DE); Thomas Schiestel, Stuttgart (DE)

(73) Assignees: Uhde GmbH, Dortmund (DE); BORSIG Process Heat Exchanger GmbH, Berlin (DE)

( * ) Notice: Subject to any disclaimer, the term of this patent is extended or adjusted under 35 U.S.C. 154(b) by 406 days.

(21) Appl. No.: 11/815,224

(22) PCT Filed: Jan. 23, 2006

(86) PCT No.: PCT/EP2006/000546

§ 371 (c)(1),
(2), (4) Date: Mar. 11, 2008

(87) PCT Pub. No.: WO2006/081959

PCT Pub. Date: Aug. 10, 2006

(65) Prior Publication Data

US 2008/0272345 A1    Nov. 6, 2008

(30) Foreign Application Priority Data

Feb. 4, 2005    (DE) .................. 10 2005 005 464

(51) Int. Cl.
*B01D 39/00*    (2006.01)
*B01D 39/06*    (2006.01)
*B01D 39/20*    (2006.01)
*B01D 33/21*    (2006.01)

(52) U.S. Cl. .................. 210/500.25; 210/500.26; 210/500.23; 55/523; 55/524; 96/4; 501/126

(58) Field of Classification Search ............ 210/500.23, 210/500.25, 500.26; 55/53, 524, 523; 96/4, 96/11; 501/126
See application file for complete search history.

(56) References Cited

U.S. PATENT DOCUMENTS

| | | | |
|---|---|---|---|
| 3,137,602 A | 6/1964 | Lincoln | |
| 3,986,528 A * | 10/1976 | Green | 138/177 |
| 4,175,153 A | 11/1979 | Dobo et al. | |
| 4,222,977 A | 9/1980 | Dobo | |
| 4,446,024 A * | 5/1984 | Baker et al. | 210/500.21 |
| 5,127,783 A * | 7/1992 | Moghe et al. | 411/411 |
| 5,707,584 A | 1/1998 | Terpstra et al. | |
| 5,820,833 A * | 10/1998 | Kawamura | 422/174 |
| 5,821,185 A | 10/1998 | White et al. | |
| 5,925,590 A | 7/1999 | White et al. | |
| 6,033,632 A | 3/2000 | Schwartz et al. | |
| 6,037,514 A | 3/2000 | White et al. | |
| 6,146,549 A | 11/2000 | Mackay et al. | |
| 6,165,431 A | 12/2000 | Mackay et al. | |
| 6,214,757 B1 | 4/2001 | Schwartz et al. | |
| 6,281,403 B1 | 8/2001 | White et al. | |
| 6,361,693 B1 * | 3/2002 | Park | 210/321.89 |
| 6,471,921 B1 | 10/2002 | Van Calcar et al. | |
| 6,547,967 B1 | 4/2003 | Adler et al. | |
| 6,592,782 B2 | 7/2003 | MacKay et al. | |
| 6,641,626 B2 | 11/2003 | Van Calcar et al. | |
| 6,712,131 B1 * | 3/2004 | Brinkman et al. | 165/158 |

FOREIGN PATENT DOCUMENTS

| | | |
|---|---|---|
| CN | 1280554 A | 1/2001 |
| DE | 4425209 A1 | 1/1996 |
| DE | 10043666 C1 | 10/2001 |
| GB | 390199 | 3/1933 |
| GB | 2022565 A | 12/1979 |

OTHER PUBLICATIONS

Sundmacher, K et al., "Solid Electrolyte Membrane Reactors: Status and Trends", Catalysis Today, 2005, vol. 104, pp. 185-199.

Munder, B et al., "Solid Electrolyte Membrane Reactor for Controlled Partial Oxidation of Hydrocarbons: Model and Experimental Validation", Catalysis Today, 2005, vol. 104, pp. 138-148.

(Continued)

*Primary Examiner*—Ana M Fortuna
(74) *Attorney, Agent, or Firm*—Connolly Bove Lodge & Hutz LLP

(57) ABSTRACT

Composites comprising at least one hollow fiber of oxygen-transporting ceramic material, which is a ceramic material which conducts oxygen anions and electrons or a combination of ceramic material which conducts oxygen anions and a ceramic or nonceramic material which conducts electrons, with the outer surface of the hollow fiber being in contact with the outer surface of the same hollow fiber or another hollow fiber and the contact points being joined by sintering, are described.

Further composites comprise at least one hollow fiber of oxygen-transporting ceramic material which is a ceramic material which conducts oxygen anions and electrons or a combination of ceramic material which conducts oxygen anions and ceramic or nonceramic material which conducts electrons and a connection element for the introduction or discharge of fluids at at least one end face, with hollow fibers and connection element being joined.

The composites can be used for isolating oxygen from oxygen-containing gas mixtures or for carrying out oxidation reactions.

44 Claims, No Drawings

OTHER PUBLICATIONS

Bouwneester, H.J.M., et al., "Chapter 10. Dense Ceramic Membranes for Oxygen Separation", Burggaaf, A. J., ed., Fundamentals of Inorganic Membrane Science and Technology, 1996, pp. 435-439.

Mazanec, T. J., et al., "Electrocatalytic Cells for Chemical Reaction", Solid State Ionics, 1992, vol. 53-56, pp. 111-118.

Bredesen, R., et al., "High-Temperature Membranes in Power Generation with $CO_2$ Capture", Chemical Engineering and Processing, 2004, vol. 43, pp. 1129-1158.

"Ionic and Electronically Conducting Ceramic Materials", NASA SBIR Success, http.//sbir.gsfc.nasa.gov/SBIR/successes/ss/096text.html, Jan. 3, 2005.

Dong, H., et al., "Partial Oxidation of Methane to Syngas in a Mixed-Conducting Oxygen Permeable Membrane Reactor", Chinese Science Bulletin, 2000, vol. 45, No. 3, pp. 224-226.

Fernie, J. A., et al., "Progress in Joining of Advanced Materials", Welding & Metal Fabrication, 1991, vol. 59, No. 4, pp. 179-184.

Maloletov, M. P., et al., "Stresses in Encircling Electron Beam Welded Joints Between Alumina-Based Ceramics and Metals", Welding International, 1993, vol. 7, No. 7, pp. 566-568.

Intrater, J., "The Challenge of Bonding Metals to Ceramics: Joints Between Metals and Ceramics are Becoming Ever More Important in the Production of Electronic Components and Other High-Tech Products", Machine Design, 1989, vol. 61, No. 24, pp. 95-100.

Tong, J., et al., "Investigation of Ideal Zirconium-Doped Perovskite-Type Ceramic Membrane Materials for Oxygen Separation", Journal of Membrane Science, 2002, vol. 5229, pp. 1-15.

Ramanarayanan, T. A., et al., "High Temperature Ion Conducting Ceramics", Electrochemical Society *Interface*, 2001, pp. 22-27.

Liu, S., et al., "Preparation and Characterisation of $SrCe_{0.95}Yb_{0.05}O_{2.975}$ Hollow Fibre Membranes", Journal of Membrane Science, 2001, vol. 193, pp. 249-260.

Luyten, J., et al., "Perovskite-Type Oxide Capillaries for Oxygen Permeation", CIMTEC, 2002, pp. 249-258.

Mitberg, E., et al., "Crystal Structure of Oxygen Conducting Ceramic $La1-xSrxCoO3-\delta$." Condensed Matter Research with Neutrons and Muons (NUM), 1998, p. 1.

\* cited by examiner

COMPOSITE CERAMIC HOLLOW FIBRES METHOD FOR PRODUCTION AND USE THEREOF

RELATED APPLICATIONS

This application is a national stage application (under 35 U.S.C. §371) of PCT/EP2006/000546, filed Jan. 23, 2006, which claims benefit of German application 10 2005 005 464.1, filed Feb. 4, 2005.

The present invention relates to composites of hollow ceramic fibres which are highly suitable for recovering oxygen from oxygen-containing fluids or for carrying out oxidation reactions.

Hollow ceramic fibres are known per se. Their production is described, for example, in U.S. Pat. No. 4,222,977 or U.S. Pat. No. 5,707,584.

In J. Mem. Sci. 193 (2001) 249-260, S. Liu, X. Tan, K. Li and R. Hughes report the production of ceramic membranes and hollows fibres composed of $SrCe_{0.95}Yb_{0.05}O_{2.975}$. Gastight hollow fibres are produced and their mechanical properties and their microstructure are studied.

In CIMTEC 2002, pp. 249-258, J. Luyten reports the production of ceramic perovskite fibres. Hollow fibres of $La_{0.6}Sr_{0.4}Co_{0.8}Fe_{0.2}O_{3-\delta}$ are described.

In J. Mem. Sci. 5229 (2002) 1-15, J. Tong, W. Yang, B. Zhu and R. Cai report studies on zirconium-doped ceramic membranes of the perovskite type for oxygen separation. Membranes of $BaCu_{0.4}Fe_{0.6-x}Zr_xO_{3-\delta}$ are described.

Further oxygen-conducting ceramic materials are disclosed in U.S. Pat. No. 6,165,431, U.S. Pat. No. 6,146,549, U.S. Pat. No. 6,471,921 and U.S. Pat. No. 6,592,782.

Membranes composed of ceramic materials can firstly be made gastight and, secondly, selected ceramic materials display oxygen permeability and can therefore be used for separating oxygen from gas mixtures. Possible applications of such ceramics are, in particular, high-temperature applications such as gas separation or new types of membrane reactors.

The use of oxygen-conducting ceramic membranes in reactors for oxidation reactions is described, for example, in U.S. Pat. No. 6,214,757, U.S. Pat. No. 6,033,632 and U.S. Pat. No. 6,641,626.

An overview of possible uses and materials for high-temperature ion-conducting ceramics may be found in The Electrochemical Society Interface, Summer 2001, pp. 22-27.

The known processes for producing hollow ceramic fibres encompass a spinning process in which, in a first step, elastic green fibres are produced from a spinnable composition comprising precursors of the ceramic material and polymer. The proportion of polymer present is subsequently burnt at high temperatures and pure hollow ceramic fibres are formed.

During spinning, a phase inversion process occurs and porous membranes are generally obtained in the first step. These can also be fired to high density by means of controlled temperatures.

The fibres produced in this way have a comparatively high mechanical stability, but they naturally display the brittleness and fracture sensitivity typical of ceramic materials.

It has now surprisingly been found that hollow ceramic fibres composed of selected materials can be combined with other shaped bodies or with further hollow ceramic fibres to form more complex structures and be joined by sintering. This can be achieved without use of temporary adhesives. Structures having a significantly higher stability and considerably improved handling, especially with regard to safety considerations, are formed.

Composites of hollow inorganic fibres are known. DE 100 43 666 C1 describes a ceramic insulating material which consists of a disordered assembly of short fibre fragments. These can also be joined to one another at the contact points.

GB 2,022,565 A describes hollow fibres composed of inorganic material and having porous walls and an anisotropic pore volume profile over the cross section. Combinations of hollow metallic fibres which are twisted together and not sintered together are disclosed.

The present invention is based on the surprising recognition that precursors of selected ceramic materials sinter together very efficiently on heating at the contact points with other materials without the use of an auxiliary such as an adhesive or a slip being necessary for this.

It is an object of the present invention to provide structures composed of one or more hollow ceramic fibres or of hollow ceramic fibres together with other shaped parts.

A further object of the present invention is to provide simple processes for producing these structures, in which customary apparatuses for producing shaped ceramic bodies can be used.

The present invention provides a composite comprising at least one hollow fibre of oxygen-transporting ceramic material, which is a ceramic material which conducts oxygen anions and electrons or a combination of ceramic material which conducts oxygen anions and a ceramic or nonceramic material which conducts electrons, with the outer surface of the hollow fibre being in contact with the outer surface of the same hollow fibre or another hollow fibre of oxygen-transporting ceramic material and the contact points being joined by sintering.

A further embodiment of the present invention provides a composite comprising at least one hollow fibre of oxygen-transporting ceramic material which is a ceramic material which conducts oxygen anions and electrons or a combination of ceramic material which conducts oxygen anions and ceramic or nonceramic material which conducts electrons, with one end face, preferably both end faces, of the hollow fibre being provided with a connection element connected thereto, preferably a connection element joined to the hollow fibre by sintering, for the introduction or discharge of fluids.

The hollow fibres used according to the invention can have any cross sections, for example angular, elliptical or in particular circular cross sections.

For the purposes of the present description, hollow fibres are structures which have a hollow interior space and can have any external dimensions, i.e. diameter or linear dimensions.

For the purposes of the present description, hollow fibres can refer not only to the classical meaning of this term but also to capillaries having external diameters of from 0.5 to 5 mm and tubes having external diameters of more than 5 mm.

Preferred external diameters or linear dimensions of the hollow fibres vary in the range up to 5 mm.

Particular preference is given to using hollow fibres having external diameters of less than 3 mm.

For the purposes of the present description, hollow fibres are hollow fibres having any lengths. Examples are hollow monofilaments or hollow staple fibres (monofilaments of finite length).

In the composites of the invention, use is typically made of hollow ceramic fibres whose length considerably exceeds the external diameter. Hollow ceramic fibres which are preferably used have ratios of length to external diameter of at least 50:1, preferably at least 100:1 and in particular at least 200:1.

The composites of the invention are structures having a predetermined geometric shape (in contrast to accumulations of hollow fibres in disordered assemblies having random orientation) which have been formed by joining of at least one hollow fibre, preferably a plurality of hollow fibres, to form a composite, with this composite having at least one interior space formed by the internal volume of the hollow fibres and at least one exterior space formed by the volume surrounding the hollow fibres. The composite is typically configured so that a fluid can flow through the interior space and be depleted in oxygen during passage through the interior space, with the oxygen being transported through the walls of the hollow ceramic fibres into the exterior space. Arrangements in which transport of oxygen occurs in the reverse direction are also possible.

The composites of the invention can represent any combinations of hollow ceramic fibres composed of oxygen-transporting ceramic material.

It is possible to produce, for example, the following composites:
- a plurality of hollow fibres in longitudinal contact arranged in a plane
- a plurality of braided hollow fibres or a plurality of hollow fibres twisted together
- a plurality of hollow fibres combined to form a monolith (multichannel element made up of hollow fibres)

Due to the flexibility and elasticity of the green fibres in which the proportion of ceramic (precursor) phase is not too high, many further geometries are possible. As a result of this structuring, the fibres retain their original functionality (i.e. the gas permeability for oxygen conduction).

Such composites can then be assembled further to produce membrane modules. These systems are suitable, in particular, for use in high-temperature applications such as gas separation or as components of membrane reactors.

The hollow fibres used according to the invention can be produced by a spinning process known per se. This can be a solution spinning process such as dry or wet spinning or a melt spinning process.

The composition to be spun comprises the finely divided ceramic material or its precursor and also a spinnable polymer.

The content of spinnable polymer in the composition to be spun can vary within a wide range, but is typically from 2 to 30% by weight, preferably from 5 to 10% by weight, based on the total composition to be spun or spinning solution.

The content of finely divided ceramic material or its precursor in the composition to be spun can likewise vary within a wide range, but is typically from 20 to 90% by weight, preferably from 40 to 60% by weight, based on the total composition to be spun or spinning solution.

The content of solvent in the composition to be spun can vary within a wide range, but is typically from 10 to 80% by weight, preferably from 35 to 45% by weight, based on the total spinning solution.

The type and amount of spinnable polymer and finely divided ceramic material or its precursor are preferably selected so that compositions which are just still spinnable are obtained, with the content of spinnable polymer being kept as low as possible.

Spinning is effected by extrusion of the spinning solution or the heated and plasticized spinning composition through an annular nozzle, followed by cooling in air and/or introduction into a precipitation bath which contains a nonsolvent for the polymer used in the spinning composition.

The green hollow fibres obtained can then be subjected to further processing steps, for example cutting to form staples or rolling up for temporary storage.

In a processing step following shaping, the green hollow fibre obtained is combined to form the desired composite.

This green composite can be a combination of a plurality of identical or different green hollow fibres or a combination of one or more green hollow fibres with at least one connection element for introduction or discharge of fluids, e.g. liquids or in particular gases, at their end faces.

The green hollow fibres can be combined by any techniques. Examples are manual combination such as the laying of parallel hollow fibres next to one another and also textile-producing techniques such as the production of knitteds, woven fabrics, lay-ups, braids or twisted structures.

After production of the composite of the green hollow fibre(s), the polymer is removed in a manner known per se by thermal treatment. This step also encompasses the formation of a ceramic from the precursor for the ceramic material and/or a sintering of the finely divided ceramic particles. The properties of the ceramic formed can be controlled in a manner known to those skilled in the art by selection of treatment parameters such as temperature program and atmosphere.

Hollow fibres present in the composites of the invention comprise oxygen-transporting ceramic material. Such materials are known per se.

Typical values for the oxygen transport of the composites of the invention are oxygen fluxes of at least 0.01 standard $cm^3/(min*cm^2)$ preferably at least 0.1 standard $c/(min*cm^2)$, measured as a mean over the total surface of the composite in question. Here, standard $cm^3$ is standard cubic centimeters (at 1 bar and 25° C.). The values given for the oxygen flux are, for the purposes of the present description, determined at 950° C. and an oxygen partial pressure difference between the two free gas phases of 0.2 bar, with the higher oxygen partial pressure being 0.2 bar.

These ceramics can comprise materials which conduct oxygen anions and electrons. However, it is also possible to use combinations of different ceramics or of ceramic and nonceramic materials, for example combinations of ceramics which conduct oxygen anions and ceramics which conduct electrons or combinations of different ceramics which each conduct oxygen anions and electrons or of which not all components display oxygen conduction or combinations of oxygen-conducting ceramic materials with nonceramic materials such as metals.

Examples of preferred multiphase membrane systems are mixtures of ceramic displaying ion conductivity and a further material displaying electron conductivity, in particular a metal. These include, in particular, combinations of materials having fluorite structures or fluorite-related structures with electron-conducting materials, e.g. combinations of $ZrO_2$ or $CeO_2$, which may each be doped with $CaO$ or $Y_2O_3$, with metals such as palladium.

Further examples of preferred multiphase membrane systems are mixed structures having a partial perovskite structure, i.e. mixed systems in which various crystal structures are present in the solid and at least one of these is a perovskite structure or a perovskite-related structure.

Oxygen-transporting materials which are preferably used are oxide ceramics, among which those having a perovskite structure or a brownmillerite structure or an aurivillite structure are particularly preferred.

Perovskites used according to the invention typically have the $ABO_{3-\delta}$ structure, where A is a divalent cation and B is a trivalent or higher-valent cation, the ionic radius of A is greater than the ionic radius of B and $\delta$ is from 0.001 to 1.5, preferably from 0.01 to 0.9 and more preferably from 0.01 to 0.5 so as to make the material electrically neutral. Mixtures of different cations A and/or cations B can also be present in the perovskites used according to the invention.

Brownmillerites used according to the invention typically have the $A_2B_2O_{5-\delta}$ structure, where A, B and δ are as defined above. In the brownmillerites used according to the invention, too, mixtures of different cations A and/or cations B can be present.

Cations B can preferably occur in a plurality of oxidation states. However, part or all cations of type B can also be trivalent or higher-valent cations having a constant oxidation state.

Oxide ceramics which are particularly preferably used contain cations of type A selected from among cations of main group II, transition group I, transition group II, the lanthanide group and mixtures of these cations, preferably from among $Mg^{2+}$, $Ca^{2+}$, $Sr^{2+}$, $Cu^{2+}$, $Ag^{2+}$, $Zn^{2+}$, $Cd^{2+}$ and the lanthanides.

Oxide ceramics which are particularly preferably used contain cations of type B selected from among cations of groups IIIB to VIIIB of the Periodic Table and the lanthanide group, the metals of main groups III to V and mixtures of these cations, preferably from among $Fe^{3+}$, $Fe^{4+}$, $Ti^{3+}$, $Ti^{4+}$, $Zr^{3+}$, $Zr^{4+}$, $Ce^{3+}$, $Ce^{4+}$, $Mn^{3+}$, $Mn^{4+}$, $Co^{2+}$, $Co^{3+}$, $Nd^{3+}$, $Nd^{4+}$, $Gd^{3+}$, $Gd^{4+}$, $Sm^{3+}$, $Sm^{4+}$, $Dy^{3+}$, $Dy^{4+}$, $Ga^{3+}$, $Yb^{3+}$, $Al^{3+}$, $Bi^{4+}$ and mixtures of these cations.

Further oxide ceramics which are particularly preferably used contain cations of type B selected from among $Sn^{2+}$, $Pb^{2+}$, $Ni^{2+}$, $Pd^{2+}$, lanthanides and mixtures of these cations.

Aurivillites used according to the invention typically comprise the structural element $(Bi_2O_2)^{2+}(VO_{3.5}[\ ]_{0.5})^{2-}$ or related structural elements, where [ ] is an oxygen vacancy.

Very particular preference is given to composites whose oxygen-transporting oxide ceramic having a perovskite structure comprises the elements Ba, Sr, Fe, Zn and O or the elements Ba, Co, Fe, Zr and O, in particular an oxide ceramic having the composition $BaCo_xFe_yZr_zO_{3-\delta}$ where the sum of x, y and z is 1, z is from 0.1 to 0.5, x is in the region of a*y, a is from 0.8 to 1.2 and δ is as defined above.

The invention also provides a process for producing the above-described composites, which comprises the measures:
i) production of a green hollow fibre by extrusion of a composition comprising a polymer and a ceramic, in particular an oxide ceramic, or a precursor of a ceramic through a nozzle, preferably an annular nozzle, in a manner known per se,
ii) production of a green composite from one or more of the green hollow fibres produced in step i) by formation of contacts between the outer surface(s) of the green hollow fibre(s), and
iii) thermal treatment of the green composite produced in step ii) in order to remove the polymer, in the case of the use of a precursor of a ceramic in step i) to form the ceramic and to establish the contact between the hollow ceramic fibres.

In a further embodiment, the invention provides a process for producing the above-defined composite, which comprises the measures:
i) production of a green hollow fibre by extrusion of a composition comprising a polymer and a ceramic, in particular an oxide ceramic, or a precursor of a ceramic through a nozzle, preferably an annular nozzle, in a manner known per se,
iv) production of a green composite from one or more of the green hollow fibres produced in step i) and at least one connection element for the introduction or discharge of fluids at least one end face of the green hollow fibres, and
v) thermal treatment of the green composite produced in step iv) in order to remove the polymer, and establish the contact between the hollow ceramic fibres and the at least one connection element and also in the case of the use of a precursor of a ceramic in step i) to form the ceramic, in particular the oxide ceramic.

External diameter ($D_e$) and internal diameter ($D_i$) of the hollow fibres produced according to the invention can vary within a wide range. Examples of $D_e$ are from 0.1 to 5 mm, in particular from 0.5 to 3 mm. Examples of $D_i$ are from 0.01 to 4.5 mm, in particular from 0.4 to 2.8 mm.

Particular preference is given to producing hollow fibres in the form of monofilaments whose cross sectional shape is circular, oval or n-sided, with n being greater than or equal to 3.

In the case of noncircular fibre cross sections, $D_e$ is the largest dimension of the outer cross section and $D_i$ is the largest dimension of the internal cross section.

Polymers known per se for the production of ceramic fibres can be used for producing the hollow fibres used according to the invention. The polymer can in principle be any polymer which can be spun from the melt or from solution. Examples of polyesters, polyamides, polysulphones, polyarylene sulphides, polyether sulphones and cellulose.

To produce the hollow fibres used according to the invention, it is possible to use ceramic compositions which are known per se for the production of ceramic fibres and have an oxygen conductivity, or precursors thereof. Examples of oxygen-conducting ceramic compositions have been mentioned above. The precursors of these ceramic compositions can be, for example, mixtures which are still noncrystalline or partly crystalline during shaping and are converted into the desired crystal structure only during sintering of the shapes.

After extrusion of the spinning composition through a spinning nozzle, the green hollow fibre is introduced into a precipitation bath or cooling bath, preferably into a water bath, and subsequently rolled up.

The takeoff speed is usually from 1 to 100 m per minute, preferably from 5 to 20 m/min.

The green hollow fibres can comprise not only the ceramic materials or their precursors and the polymers but also further auxiliaries. Examples of these are stabilizers for the slip, e.g. polyvinyl alcohol, polyethylene glycol, surfactants, ethylene-diaminetetra-acetic acid or citric acid, additives for adjusting the viscosity of the slip, e.g. polyvinylpyrrolidone, or salts as sources of cations for doping the ceramic.

After production of the green hollow fibres, these are combined in the manner described above to form composites, i.e. combined with other green hollow fibres and/or with inlets and outlets for fluids. The inlets and outlets can be shaped bodies composed of metals, ceramics or precursors of ceramics.

The green composites are subsequently heat treated. This can be carried out in air or in a protective gas atmosphere. Temperature program and sintering times have to be matched to the individual case. The parameters to be set for this purpose are known to those skilled in the art. The heat treatment step leads to densification of the green precursor. Firstly, the polymer disappears and, secondly, the pores of the resulting ceramic close under appropriately selected heat treatment conditions so as to give gastight composites.

Instead of combining the green composites with inlets and outlets for fluids, the finished composite composed of ceramic hollow fibres can be adhesively bonded to inlets and outlets for fluids, for example using a ceramic adhesive.

The composites of the invention can be used in all industrial fields. They are preferably employed in applications in which oxidation reactions are carried out in hot and/or aggressive environments or in which oxygen has to be separated off from gas mixtures.

The invention provides for the use of the above-described composites for isolating oxygen from oxygen-containing gas mixtures, in particular air.

The invention further provides for the use of the above-described composites for carrying out oxidation reactions, in particular for the catalytic oxidation of organic compounds.

The following examples illustrate the invention without restricting it. Percentages are by weight unless indicated otherwise.

EXAMPLE 1

Production of a Green Hollow Fibre

A ceramic powder having the composition $BaCo_{0.4}Fe_{0.4}Zr_{0.2}O_{3-\delta}$ was stirred with polysulphone (UDEL P-3500, Solvay) and 1-methyl-2-pyrrolidone (NMP) ($\geqq$99.0%, Merck) to produce a slip. This was subsequently homogenized in a ball mill.

The spinning composition obtained in this way was spun through a hollow-core nozzle having an external diameter ($D_e$) of 1.7 mm and an internal diameter ($D_i$) of 1.2 mm. For this purpose, the spinning composition was introduced into a pressure vessel and pressurized with nitrogen. After the stopcock on the pressure vessel was opened, the spinning composition flowed out and was extruded through the hollow-core nozzle. The green fibre strand was conveyed through a precipitation water bath and subsequently dried.

EXAMPLE 2

Production of a Composite Composed of Hollow Ceramic Fibres

A plurality of hollow fibres produced as described in Example 1 were arranged parallel to one another so that they were in contact along their outer wall.

This composite of green hollow fibres was sintered while suspended in a furnace.

Sintering was carried out according to the following temperature program:

| | |
|---|---|
| 96° C./h | 500° C. (1 h hold) |
| 120° C./h | 1000° C. |
| 60° C./h | 1300° C. (6 h hold) |
| 120° C./h | 800° C. |
| 180° C./h | 80° C. |

After sintering, a cohesive composite of individual hollow fibres was obtained. The individual hollow fibres had a length of 30-35 cm and diameters $D_e$ of 0.8-0.9 mm and $D_i$ of 0.5-0.6 mm.

The hollow fibres produced as described in Example 2 had a selective permeability for oxygen.

EXAMPLE 3

Production of a Further Composite Composed Of Hollow Ceramic Fibres

A plurality of hollow fibres produced as described in Example 1 were manually braided and treated thermally by the method described in Example 2.

After sintering, a cohesive braid of individual hollow fibres was obtained.

The hollow fibres produced as described in Example 3 had a selective permeability for oxygen.

EXAMPLE 4

Production of a Further Composite Composed Of Hollow Ceramic Fibres

A plurality of hollow fibres produced as described in Example 1 were manually combined with one another on the surface of a rod-shaped mould so that they formed a tubular multichannel element whose individual capillaries were hollow fibres running parallel to one another.

The green multichannel element obtained was treated thermally by the method described in Example 2.

The interior space of the multichannel element was empty after sintering and removal of the rod-shaped mould. A multichannel element composed of parallel hollow fibres which were sintered together and had a selective permeability for oxygen was obtained.

EXAMPLE 5

Production of a Further Composite Composed Of Hollow Ceramic Fibres

A plurality of hollow fibres produced as described in Example 1 were wound along the surface of a rod-shaped mould so that they formed a helix-shaped multichannel element whose individual capillaries were in contact along the helix.

The green multichannel element obtained was treated thermally by the method described in Example 2.

The interior space of the multichannel element was empty after sintering and removal of the rod-shaped mould. A multichannel element composed of hollow fibres which were sintered together and ran parallel to one another in a helix shape and had a selective permeability for oxygen was obtained.

EXAMPLE 6

Production of a Composite Composed of Hollow Ceramic Fibres with Connection Elements for the Introduction and Discharge of Gases A plurality of hollow fibres produced as described in Example 1 were manually combined with one another so that they formed a multichannel element whose individual capillaries were hollow fibres running parallel to one another. The interior space of the multichannel element was, when viewed in cross section, completely filled with hollow fibres.

Metallic connection elements for the introduction and discharge of gases were attached at both end faces of the green multichannel element.

The green composite obtained was treated thermally by the method described in Example 2.

After sintering, a multichannel element composed of parallel hollow fibres which were sintered together and had a selective permeability for oxygen was obtained. This multichannel element was connected firmly by sintering to the metallic connection elements at both end faces.

EXAMPLE 7

Production of a Composite Composed of Hollow Ceramic Fibres with Connection Elements for the Introduction and Discharge of Gases Example 6 was repeated with the modification that no metallic connection elements for the introduction and discharge of gases were attached to the green multichannel element. After sintering of the ceramic multichannel element, two connection elements were joined on at both end faces of the ceramic hollow fibres with the aid of a ceramic adhesive. This composite was subsequently heated at 100° C. to give a multichannel element which had metallic connection elements attached to both its end faces.

The invention claimed is:

1. A composite comprising at least one hollow fibre comprising
    (A) an oxygen-transporting ceramic material, wherein said ceramic material conducts oxygen anions and electrons, and wherein said oxygen-transporting ceramic material is an oxide ceramic having a perovskite structure $ABO_{3-\delta}$, wherein
        (1) A is a divalent cation;
        (2) B is a trivalent or higher-valent cation;
        (3) the ionic radius of A is greater than the ionic radius of B;
        (4) $\delta$ is from 0.01 to 0.9, rendering said oxide ceramic electrically neutral; and
        (5) A and/or B are optionally present as mixtures of different cations;
    or
    (B) a combination of a ceramic material which conducts oxygen anions and a ceramic or nonceramic material which conducts electrons;
    wherein the outer surface of said at least one hollow fibre is in contact with the outer surface of the same hollow fibre or another hollow fibre of oxygen-transporting ceramic material and wherein the contact points are joined by sintering.

2. The composite of claim 1, wherein said composite comprises a plurality of hollow fibres which have been braided or twisted together.

3. The composite of claim 1, wherein said composite comprises at least two hollow fibres which are comprised of oxygen-transporting ceramic material and run parallel to one another and whose outer walls are in contact along at least part of their length.

4. The composite of claim 3, wherein said composite comprises a plurality of parallel hollow fibres or tubes which are arranged in the form of a tubular multichannel element and whose outer walls are in contact along at least part of their length.

5. The composite of claim 4, wherein said plurality of parallel hollow fibres or tubes form the outer wall of a tubular multichannel element whose interior space is hollow or comprises a rod-shaped reinforcing material.

6. The composite of claim 5, wherein said plurality of parallel hollow fibres or tubes run parallel along the inside of a tube composed of gastight or porous material.

7. The composite of claim 5, wherein said hollow interior space of the tubular multichannel element comprises an oxidation catalyst.

8. The composite of claim 1, wherein said at least one hollow fibre are woven, formed-loop knitted, or drawn-loop knitted with one another.

9. The composite of claim 1, wherein said divalent cations are selected from the group consisting of cations of main group II, cations of transition group I, cations of transition group II, cations of the lanthanide group, and mixtures thereof.

10. The composite of claim 1, wherein said trivalent or higher-valent cations are selected from the group consisting of cations of IIIB to VIIIB of the Periodic Table, cations of the lanthanide group, cations of the metals of main group V; and mixtures thereof.

11. The composite of claim 1, wherein said oxide ceramic having a perovskite structure comprises the elements Ba, Sr, Fe, Zn, and O or the elements Ba, Co, Fe, Zr, and O.

12. A composite comprising at least one hollow fibre comprising
    (A) an oxygen-transporting ceramic material, wherein said ceramic material conducts oxygen anions and electrons, and wherein said oxygen-transporting ceramic material is an oxide ceramic having a brownmillerite structure $A_2B_2O_{5-\delta}$, wherein
        (1) A is a divalent cation;
        (2) B is a trivalent or higher-valent cation;
        (3) the ionic radius of A is greater than the ionic radius of B;
        (4) $\delta$ is from 0.01 to 0.9, rendering said oxide ceramic electrically neutral; and
        (5) A and/or B are optionally present as mixtures of different cations;
    or
    (B) a combination of a ceramic material which conducts oxygen anions and a ceramic or nonceramic material which conducts electrons;
    wherein the outer surface of said at least one hollow fibre is in contact with the outer surface of the same hollow fibre or another hollow fibre of oxygen-transporting ceramic material and wherein the contact points are joined by sintering.

13. The composite of claim 12, wherein said composite comprises a plurality of hollow fibres which have been braided or twisted together.

14. The composite of claim 12, wherein said composite comprises at least two hollow fibres which are comprised of oxygen-transporting ceramic material and run parallel to one another and whose outer walls are in contact along at least part of their length.

15. The composite of claim 14, wherein said composite comprises a plurality of parallel hollow fibres or tubes which are arranged in the form of a tubular multichannel element and whose outer walls are in contact along at least part of their length.

16. The composite of claim 15, wherein said plurality of parallel hollow fibres or tubes form the outer wall of a tubular multichannel element whose interior space is hollow or comprises a rod-shaped reinforcing material.

17. The composite of claim 16, wherein said plurality of parallel hollow fibres or tubes run parallel along the inside of a tube composed of gastight or porous material.

18. The composite of claim 16, wherein said hollow interior space of the tubular multichannel element comprises an oxidation catalyst.

19. The composite of claim 12, wherein said at least one hollow fibre are woven, formed-loop knitted, or drawn-loop knitted with one another.

20. The composite of claim 12, wherein said divalent cations are selected from the group consisting of cations of main group II, cations of transition group I, cations of transition group II, cations of the lanthanide group, and mixtures thereof.

21. The composite of claim 12, wherein said trivalent or higher-valent cations are selected from the group consisting of cations of IIIB to VIIIB of the Periodic Table, cations of the lanthanide group, cations of the metals of main group V; and mixtures thereof.

22. The composite of claim 12, wherein said oxide ceramic has a perovskite structure comprising the elements Ba, Sr, Fe, Zn, and O or the elements Ba, Co, Fe, Zr, and O.

23. A composite comprising at least one hollow fibre comprising
   (A) an oxygen-transporting ceramic material, wherein said ceramic material conducts oxygen anions and electrons, and wherein said oxygen-transporting ceramic material is an oxide ceramic having a perovskite structure $ABO_{3-\delta}$, wherein
      (1) A is a divalent cation;
      (2) B is a trivalent or higher-valent cation;
      (3) the ionic radius of A is greater than the ionic radius of B;
      (4) $\delta$ is from 0.01 to 0.9, rendering said oxide ceramic electrically neutral; and
      (5) A and/or B are optionally present as mixtures of different cations;
   or
   (B) a combination of a ceramic material which conducts oxygen anions and a ceramic or nonceramic material which conducts electrons;
   wherein said at least one hollow fibre comprises two end faces, wherein at least one end face of said hollow fibres comprises one or two connection elements for the introduction or discharge of fluids.

24. The composite of claim 23, wherein said composite comprises a plurality of hollow fibres which have been braided or twisted together.

25. The composite of claim 23, wherein said composite comprises at least two hollow fibres which are comprised of oxygen-transporting ceramic material and run parallel to one another and whose outer walls are in contact along at least part of their length.

26. The composite of claim 25, wherein said composite comprises a plurality of parallel hollow fibres or tubes which are arranged in the form of a tubular multichannel element and whose outer walls are in contact along at least part of their length.

27. The composite of claim 26, wherein said plurality of parallel hollow fibres or tubes form the outer wall of a tubular multichannel element whose interior space is hollow or comprises a rod-shaped reinforcing material.

28. The composite of claim 27, wherein said plurality of parallel hollow fibres or tubes run parallel along the inside of a tube composed of gastight or porous material.

29. The composite of claim 27, wherein said hollow interior space of the tubular multichannel element comprises an oxidation catalyst.

30. The composite of claim 23, wherein said at least one hollow fibre are woven, formed-loop knitted, or drawn-loop knitted with one another.

31. The composite of claim 23, wherein said divalent cations are selected from the group consisting of cations of main group II, cations of transition group I, cations of transition group II, cations of the lanthanide group, and mixtures thereof.

32. The composite of claim 23, wherein said trivalent or higher-valent cations are selected from the group consisting of cations of IIIB to VIIIB of the Periodic Table, cations of the lanthanide group, cations of the metals of main group V; and mixtures thereof.

33. The composite of claim 23, wherein said oxide ceramic has a perovskite structure comprising the elements Ba, Sr, Fe, Zn, and O or the elements Ba, Co, Fe, Zr, and O.

34. A composite comprising at least one hollow fibre comprising
   (A) an oxygen-transporting ceramic material, wherein said ceramic material conducts oxygen anions and electrons, and wherein said oxygen-transporting ceramic material is an oxide ceramic having a brownmillerite structure $A_2B_2O_{5-\delta}$, wherein
      (1) A is a divalent cation;
      (2) B is a trivalent or higher-valent cation;
      (3) the ionic radius of A is greater than the ionic radius of B;
      (4) $\delta$ is from 0.01 to 0.9, rendering said oxide ceramic electrically neutral; and
      (5) A and/or B are optionally present as mixtures of different cations;
   or
   (B) a combination of a ceramic material which conducts oxygen anions and a ceramic or nonceramic material which conducts electrons;
   wherein said at least one hollow fibre comprises two end faces, wherein at least one end face of said hollow fibres comprises one or two connection elements for the introduction or discharge of fluids.

35. The composite of claim 34, wherein said composite comprises a plurality of hollow fibres which have been braided or twisted together.

36. The composite of claim 34, wherein said composite comprises at least two hollow fibres which are comprised of oxygen-transporting ceramic material and run parallel to one another and whose outer walls are in contact along at least part of their length.

37. The composite of claim 36, wherein said composite comprises a plurality of parallel hollow fibres or tubes which are arranged in the form of a tubular multichannel element and whose outer walls are in contact along at least part of their length.

38. The composite of claim 37, wherein said plurality of parallel hollow fibres or tubes form the outer wall of a tubular multichannel element whose interior space is hollow or comprises a rod-shaped reinforcing material.

39. The composite of claim 38, wherein said plurality of parallel hollow fibres or tubes run parallel along the inside of a tube composed of gastight or porous material.

40. The composite of claim 38, wherein said hollow interior space of the tubular multichannel element comprises an oxidation catalyst.

41. The composite of claim 34, wherein said at least one hollow fibre are woven, formed-loop knitted, or drawn-loop knitted with one another.

42. The composite of claim 34, wherein said divalent cations are selected from the group consisting of cations of main group II, cations of transition group I, cations of transition group II, cations of the lanthanide group, and mixtures thereof.

43. The composite of claim 34, wherein said trivalent or higher-valent cations are selected from the group consisting of cations of IIIB to VIIIB of the Periodic Table, cations of the lanthanide group, cations of the metals of main group V; and mixtures thereof.

44. The composite of claim 34, wherein said oxide ceramic has a perovskite structure comprising the elements Ba, Sr, Fe, Zn, and O or the elements Ba, Co, Fe, Zr, and O.

* * * * *